United States Patent
Manfredotti et al.

[19]

[11] Patent Number: 6,062,818
[45] Date of Patent: May 16, 2000

[54] ROTOR HEAD PENDULAR RESONATOR

[75] Inventors: Thomas Manfredotti, Eguilles; Michel Anthoine, Marseilles, both of France

[73] Assignee: Eurocopter, France

[21] Appl. No.: 09/164,142

[22] Filed: Sep. 30, 1998

[30] Foreign Application Priority Data

Oct. 1, 1997 [FR] France .................................. 97 12218

[51] Int. Cl.[7] .................................................. B64C 27/12
[52] U.S. Cl. .......................................... 416/145; 416/500
[58] Field of Search ................................... 416/145, 144, 416/18, 500, 170 R, 140, 134 A

[56] References Cited

U.S. PATENT DOCUMENTS

| | | | |
|---|---|---|---|
| 3,289,770 | 12/1966 | Derschmidt | 416/105 |
| 3,298,443 | 1/1967 | Burkham et al. | 416/31 |
| 4,239,455 | 12/1980 | Willem | 416/145 |
| 4,239,456 | 12/1980 | Joglekar | 416/145 |
| 5,639,214 | 6/1997 | Guimbal | 416/145 |

FOREIGN PATENT DOCUMENTS 14 56 013   5/1969   Germany .

*Primary Examiner*—F. Daniel Lopez
*Assistant Examiner*—Rhonda Barton
*Attorney, Agent, or Firm*—Piper Marbury Rudnick & Wolfe

[57] ABSTRACT

The resonator includes pendular bodies, each oscillating around an axis on a support coaxial with the rotor mast and rotated by the rotor head around the axis of the rotor at a rotational speed above the rotational speed of the rotor.

12 Claims, 1 Drawing Sheet

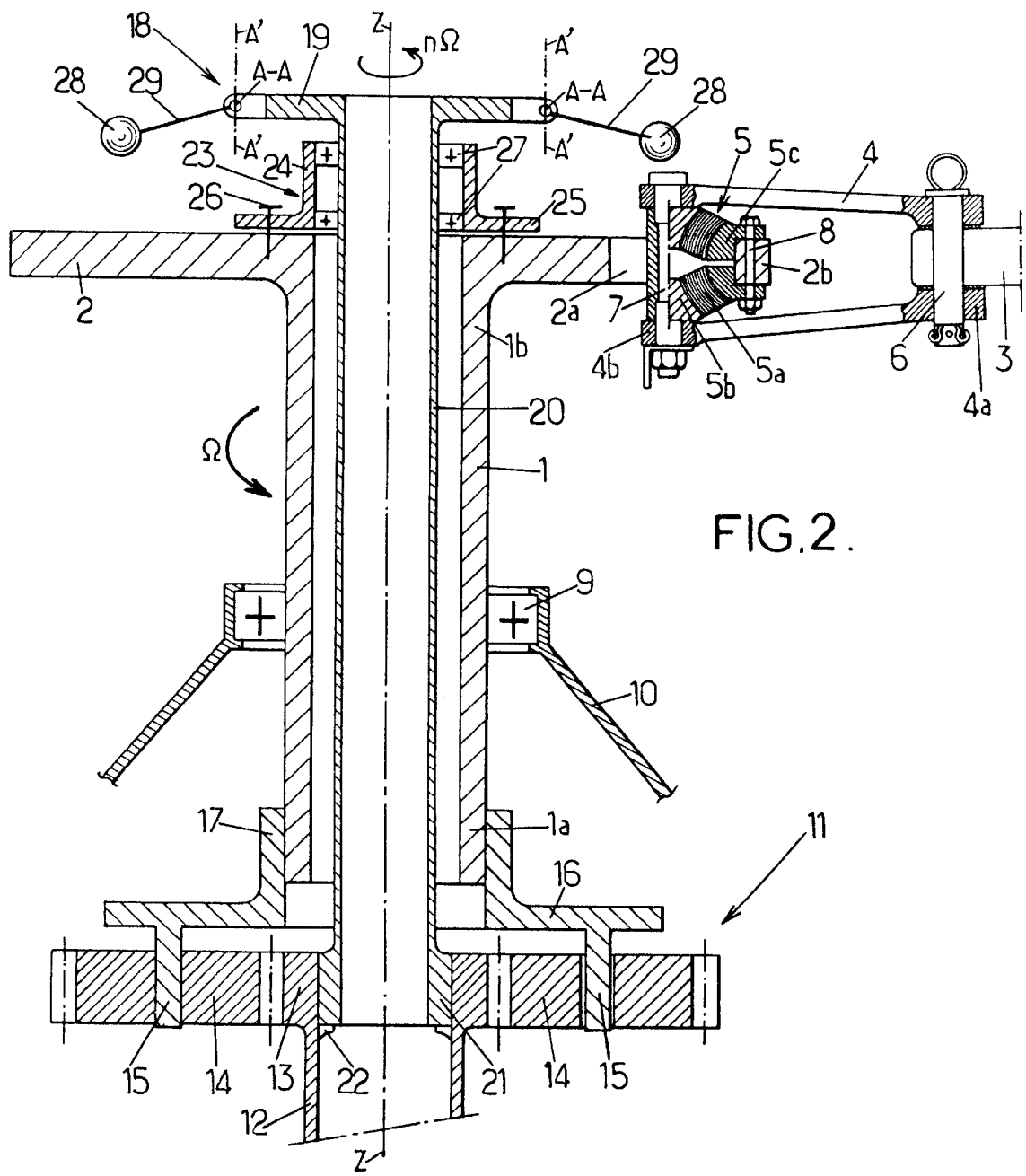

ROTOR HEAD PENDULAR RESONATOR

The invention concerns rotor head resonators, in particular those for the main rotor on a helicopter. These are the devices for attenuating the vibrations generated by the rotational motion of a rotor, the resonators being used at the position of the rotor heads in order to counter the vibrations effectively, directly at their source of production.

The most well known rotor head resonators are basically of two types.

The first type are coplanar resonators with at least one mass energised by at least one spring, for the attenuation of vibrations in a plane perpendicular to the rotational axis of the rotor. These resonators, simple and efficient in structure, have the disadvantage of being heavy and not being adaptable to a variation in the rotational speed of the rotor, and, therefore, to a variation in the frequency of the vibrations to be attenuated.

The second type are pendular resonators, which consist of at least one pendular body, mounted on the rotor so that it can oscillate around an axis of pendular motion, which is both spaced out from the axis of the rotor and from the centre of inertia of the pendular body. Pendular resonators can be coplanar, for the attenuation of vibrations in a plane perpendicular to the axis of the rotor, in which case the axis of pendular motion of a pendular body is substantially parallel to the axis of the rotor. However, pendular resonators can also be flutter resonators, for the attenuation of vibrations parallel to the axis of the rotor, and generated by the flutter or flapping of each blade, in which case the axis of pendular motion of a pendular body is both perpendicular to the axis of the rotor and to a radial axis.

These pendular resonators have the advantage of being lighter than the first type of resonator presented above, because pendular resonators use the centrifugal force as the restoring force of the pendular bodies. This characteristic allows the pendular resonators to adapt to the variations in the rotational speed of the rotor, and, therefore, to be self-adaptable or self-adjustable.

The principle at work in pendular resonators is that, by an adjustment of the size of the radius of the pendular oscillation and of the distance between the rotational axis of the rotor hub and the centre of gravity of the pendular body connected to the hub, it is possible to adapt the natural oscillation pulse to a pulse at which it is required to obtain the attenuation.

By way of illustration, FIG. 1 shows a pendular body P, of mass m, oscillating around an axis of pendular motion A on a component M, such as a rotor hub, turning around a rotational axis Z—Z at an angular velocity $\Omega$. If L refers to the coupling or fastening radius, i.e. the distance between the Z—Z and A axes, where l refers to the lever arm or the eccentricity of the pendulum, i.e. the distance between the A axis and the centre of inertia of the pendular body P, and where lo refers to the inertia of the pendular body P around the axis parallel to the A and Z—Z axes and going through its centre of inertia, the centrifugal force Fc imparts a natural pulsation $\omega$ on the pendular body P given in the formula (1) below:

$$\omega = \Omega \left( \frac{L \cdot l}{l^2 + I_0/m} \right)^{1/2}$$

This formula (1) expresses the natural frequency of a coplanar or flutter pendular resonator.

The dynamic force generated is given in formula (2) below:

$$F = N_p/2 \cdot m \cdot l \cdot \omega^2 \cdot \theta$$

where Np is the number of pendular bodies of mass m, and of eccentricity or lever arm l, and $\theta$ is the angle of inclination of the lever arm l with respect to the radial direction, relative to the rotational axis Z—Z, passing through the axis A of the pendular motion, the maximum angle $\theta$ being 15° to 20°.

On the new generation of helicopters, the use of pendular resonators is of particular interest for two reasons:

for being able to reduce the noise emitted by the helicopter, in certain flight configurations, these helicopters are equipped with rotors with a variable rotational speed, which makes the resonators of the first type mentioned above ineffective;

these helicopters have main rotors, the number of blades of which is greater than on the rotors of earlier generations of helicopters, and this large number of blades generates a low level stress and torque system, which enable effective filtering to be obtained with low mass pendular bodies.

The main disadvantage of a pendular resonator is that, for rotors with a large number of blades, the frequencies to be filtered are high, which makes it necessary to install the pendular bodies relatively far away from the rotational axis of the rotor, in order to benefit from a significant centrifugal return.

In fact, formula (2) above shows that if it is required to obtain a significant dynamic force with a low mass pendular body, the lever arm l of this pendular body must be significant, which, with formula (1) above, leads to a large coupling radius L, incompatible with the geometry of the hub.

By way of example, on a helicopter of average tonnage with the main rotor having five blades, the calculations show that the pendular bodies of a standard pendular resonator should be coupled on the airfoil section of the blades, which is very impeding.

With FR 2 733 483, a pendular resonator such as presented above is known, each pendular body of which is mounted oscillating on a support, coaxial with the rotor mast and rotated around the axis of the rotor. The rotation of the support is directly carried out by the rotor head, at the level of which a rotor mast, rotated around the rotational axis of the rotor, is rotated integrally with a hub connected to the rotor blades. Moreover, at least one pendular body is mounted pivoting around its own axis of rotation, parallel to its axis of pendular motion and located substantially nearer the centre of inertia of this pendular body than its axis of pendular motion.

Such a pendular resonator only enables a partial solution to the main disadvantage, mentioned above for this type of resonator. Moreover, the fact that some pendular bodies are driven by a double rotational motion and that, for each blade, it is preferable to provide two different pendular bodies to filter the vibrations at different frequencies, means that such a resonator is cumbersome and relatively complex, as it is composed of a large number of components.

The problem at the basis of the invention is to enable the use of pendular resonators on rotors with a large number of blades (4 or more) and with the variable rotational speed of modern helicopters, without having the main disadvantage mentioned above, and by satisfying a greater range of practical demands than, for example, the resonator known from FR 2 733 483.

Another purpose of the invention is to propose a pendular resonator, which is completely mechanical, compact (in particular in the transverse direction relative to the axis of the rotor) and especially well adapted to the main rotors of helicopters, which have a large number of blades.

With this purpose, the principle of the invention is based on an interesting feature of pendular resonators, which is revealed by formula (1) above. In fact, it can be seen that the coupling radius L varies inversely proportional to the square of the rotational speed Ω. The idea at the root of the invention is, therefore, to increase the rotational speed of the pendular bodies to reduce to a significant extent their coupling radius L.

The invention proposes a pendular resonator of the type set out above and known by FR 2 733 483 and which is characterised by the fact that the rotational support, on which the pendular bodies are mounted, is rotated on the rotor head with a rotational speed above the rotational speed Ω of the rotor.

To advantage, for the pendular resonator of the invention to be self-adjusting, and adaptable to rotor rotational speed variations, the rotational speed of the support is not only greater than the rotor rotational speed, but also is a function of this rotor rotational speed, and in particular proportional to this latter, and particularly equal to a multiple of this rotor rotational speed.

Moreover, to enable the transmission of the vertical and horizontal forces between the support and the rotor, the rotational support is connected to the rotor by at least one housing with at least one bearing for transmission of axial and transverse forces, relative to the Z—Z axis of the rotor.

In order to facilitate the positioning of the rotary support in relation to the rotor, it is an advantage that the rotary support is rotated by a transmission shaft connecting it to a driving part, itself rotated at a speed above the rotational speed Ω of the rotor.

In this case, the bearing housing can comprise to advantage at least one bearing interposed between the transmission shaft and a housing body fixed to one of the parts of the rotor, which are the hub and the rotor mast.

In particular, when the support is located above the rotor, it is an advantage that the rotor includes a tubular mast passed through by the transmission shaft coaxial with the mast and connected to the driving part on the side of the base of the rotor mast, by which said rotor mast is rotated.

This arrangement lends itself to a particularly advantageous driving configuration of the rotary support from a motor source generally available on helicopters. In fact, the rotation of a main helicopter rotor by the base of its rotor mast is generally carried out with the aid of a main transmission box, between the motor(s) or turbine engine(s) and the base of the rotor mast. This main transmission box generally comprises an output stage, which is an epicyclic reduction gear, fitted as standard with planetary reduction gearing having a ratio n of transmission reduction between the high rotational speed of its input shaft and the more reduced rotational speed of its output device, which is merely a carrier integral in rotation with the base of the rotor mast. In this case, the driving part, driving the transmission shaft of the rotary support, is to advantage the input shaft of the epicyclic reduction gear of the transmission box rotating the rotor mast.

For a simple mode of linking, the transmission shaft has axial splines in contact with complementary axial splines of the input shaft of the epicyclic reduction gear.

The resonator of the invention can be arranged as a flutter pendular resonator, on which each pendular body is mounted oscillating around a respective axis of pendular motion, which is both perpendicular to the axis of the rotor and to a respective radial axis in relation to the axis of the rotor, the resonator being tuned to a natural frequency ω proportional to Ω, where Ω is the rotational speed of the rotor.

But the resonator according to the invention can also be arranged as a coplanar pendular resonator, the axis of pendular motion of each pendular body of which is substantially parallel to the axis of the rotor, the resonator also being tuned to a natural frequency ω proportional to Ω. The natural frequency ω enables the reduction of the coplanar vibrations and/or the torque oscillations by bΩ in a fixed reference system, where b is the number of rotor blades.

In order to improve the dynamic balance of the rotor, the rotary support can to advantage be rotated in the same rotational direction as the rotor.

The rotary support can also be driven by a motor, for example electric or hydraulic, or other, located in a fixed (not revolving with the rotor) or rotating reference system.

Other advantages and features of the invention emerge from the description given below, in unrestricted account, of a version example described by reference to the annexed drawings on which:

FIG. 1, previously mentioned, is a diagram illustrating the dynamics of a simple pendular system for the attenuation of vibrations, and FIG. 2 is a schematic and partial axial cross-section of a main helicopter rotor equipped with a pendular resonator of the type of the invention.

FIG. 2 shows a rotor, the general structure of which is well known and which comprises a tubular rotor mast I, rotated by its base 1a around its axis, which is the rotational Z—Z axis of the rotor, and the upper section 1b of which rotates integrally with a hub 2 connected to the blades 3 of the rotor, only one of which is partially shown for simplicity.

In this example, the hub 2 is of the radial plate type displaying, for each blade 3, an axial cavity 2a limited by an external radial edge 2b of the hub 2. Each blade 3 is connected to the hub 2 by a linking component 4, substantially radial, and retaining and articulation means 5, themselves linking the component 4 to the hub 2. The component 4, called sleeve in the rest of the description, is fitted, on the one hand, to an external radial clevis 4a, between the two legs of which the root of the corresponding blade 3 is held by two pins such as 6, and, on the other hand, to an internal radial clevis 4b, between the two legs of which an internal radial frame 5b of retaining and articulation means 5 is braced in position by threaded pins such as 7. In this example, these means are made in the form of a spherical laminated stop, the central section 5a of which is an alternate stacking of rigid cups and elastomer layers in the shape of spherical portions with concavity turned towards the external edge 2b of the hub 2, this laminated central section 5a being adhered between the internal radial frame 5b and an external radial frame 5c fixed to the external edge 2b of the corresponding cavity 2a of the hub 2 by screw-nut assemblies schematically represented in 8. In this way, the spherical laminated stop 5, connecting a sleeve 4 of a blade 3 to the hub 2, is mainly housed in the corresponding cavity 2a of the hub 2.

The rotor thus described is rotationally guided by a bearing 9 in the upper part of a conical casing 10, secured to the structure of the helicopter and surrounding the base 1a of the rotor mast 1 and its connection to the last stage of a main transmission box, operating the rotational drive of the mast 1 from the turbine engine unit of the helicopter.

This last stage of the main transmission box is an epicyclic reduction gear 11, which includes a tubular input shaft 12, coaxial with the mast 1 and rotating integrally with a planetary gear 13 with a central gear wheel and external teeth. By its teeth, the planetary gear 13 meshes with the external teeth of satellite gears 14, rotating around parallel shafts 15, and parallel to the input shaft 12, on a satellite carrier 16 comprising a tubular output shaft 17, which rotates integrally with the base 1a of the rotor mast 1.

The reduction ratio of the epicyclic reduction gear 11 is the ratio n between the rotational speed of its input shaft 12 and the rotational speed of its output shaft 17. In this example, it is assumed that n is of the order of 4, which means that the input shaft 12 rotates at a speed, which is about four times above the rotational speed $\Omega$ of the rotor.

The rotor described above is equipped with a pendular resonator 18, which includes a support 19, in the form of a flat disk, perpendicular to the Z—Z axis and of limited radius, arranged above the hub 2, and rotated, coaxial with the mast 1 and with the hub 2, i.e. around the Z—Z axis of the rotor, by a transmission shaft 20, passing coaxially through the mast 1 and made integral by its upper end with the support 19, whereas the lower end of the shaft 20 has external axial splines 21 meshing with internal axial splines 22 in the input shaft 12 of the epicyclic reduction gear 11. On the rotor head, the rotation of the support 19 and the transmission shaft 20 around the Z—Z axis of the rotor is guided by a bearing housing 23, which includes an annular housing body 24, surrounding the upper section of the mast 1, which projects above the hub 2, and having a fixing flange 25 with which the housing 24 is screwed on to the hub 2 by screws diagrammatically shown as 26. The housing 23 also encloses two bearings 27, for example ball bearings, which are each interposed between the upper section of the shaft 20 and the body 24 of the housing 23. The rotary support 19 and its transmission shaft 20 are thus connected to the hub 2 and to the mast 1 with the bearing housing 23 enabling the transmission of vertical and horizontal forces.

Splines 22 and 21, of the input shaft 12 and the transmission shaft 20 respectively, enable the transmission of the rotary motion of the input shaft 12 to the support 19 at a rotational speed n$\Omega$, when n is, as specified above, the reduction gear ratio of the epicyclic reduction gear 11, and $\Omega$ is the rotational speed of the rotor mast 1.

At the periphery of the rotary support 19, pendular bodies 28, each at an end of a rigid rod 29, are oscillating mounted, by the other end of the corresponding rod 29, around an axis of pendular motion A—A, which is spaced out from the Z—Z axis and the centre of inertia of the pendular body 28, and which, in this example, is also perpendicular to the Z—Z axis of the rotor and to a radial axis relative to the Z—Z axis, in such a way that the axis of pendular motion A—A is perpendicular to the plane of FIG. 2. This pendular resonator 18 is, therefore, of the flutter pendulum type 28, and is tuned to a natural frequency $\omega$ equal to $\Omega$.

The number of pendular bodies 28 may be equal to the number of blades 3 of the rotor, but is always equal to at least two, and the pendular bodies 28 are evenly spaced, in the circumferential direction, on the periphery of the rotary support 19, to conform to the dynamic balance of the rotor.

As an alternative, in the case of a pendular resonator of the coplanar type, each of the pendular bodies 28 is mounted oscillating by its rod 29 around an axis of pendular motion A'—A', which is substantially parallel to the Z—Z axis of the rotor and passes through a fixed point in the periphery of the rotary support 19, these fixed points being evenly distributed on the periphery of the support 19. Also in this case, the coplanar pendular resonator can be tuned to a natural frequency $\omega$ proportional to $\Omega$. This natural frequency $\omega$ enables the reduction of coplanar vibrations and/or torque oscillations by b$\Omega$ in a fixed reference system, where b is the number of blades of the rotor.

In the example considered above, the reduction ratio n being of the order of 4, the coupling radius L of the pendular bodies 28, i.e. approximately the radius of the rotary support 19, may be reduced in a theoretical ratio of about 16 in relation to the standard mounting of a state of the art pendular resonator.

The rotary support 19 can be rotated in the same rotational direction as the rotor, according to the version of the epicyclic reduction gear 11, in order to improve the dynamic balance of the rotor.

It is understood that this achieves a compact pendular resonator, particularly compact transversely (perpendicular to the axis of the rotor), completely mechanical, therefore passive, self-adjusting, because connected to the variations in rotor speed, and particularly well adapted to the helicopter main rotors comprising a large number of blades (four or more). In fact, the resonator is fitted on the mast 1—hub 2 assembly, and not on the blades 3, and the volumes swept by the oscillating pendular bodies 28 do not interfere with the volumes swept by the blades 3 and sleeves 4, as well as the mechanisms connected to these, such as the pitch control levers, top flutter stops and drag stops, and drag dampers during the motions of the blades in pitch, fluttering and damping. Simultaneously, the pendular resonator of the invention enables to filter the high frequencies of the rotors with a high number of blades, as the pendular bodies 28 benefit from a considerable centrifugal return, without being installed far from the Z—Z axis of the rotor, as the rotational speed of the support 19 is much higher than that of the rotor mast 1.

We claim:

1. A pendular rotor resonator, for the attenuation of vibrations generated by the motion of a rotor, comprising a rotor head at the location of which a rotor mast, rotated around a rotational axis of the rotor, rotates integrally with a hub connected to blades of the rotor, the resonator comprising at least one pendular body, mounted oscillatingly around an axis of pendular motion spaced from the centre of inertia of the pendular body and from the axis of the rotor, on a support coaxial with the rotor mast and rotated around the axis of the rotor, wherein said support is rotated on the rotor head at a rotational speed above the rotational speed of the rotor.

2. A resonator according to claim 1, wherein the rotational speed of the support is a function of the rotational speed of the rotor, proportional to this, and in particular equal to a multiple of the rotational speed of the rotor.

3. A resonator according to claim 1, wherein the rotary support is connected to the rotor by at least one housing with at least one bearing for transmission of axial and transverse forces, relative to the axis of the rotor.

4. A resonator according to claim 3, wherein the rotary support is rotated by a transmission shaft connecting said support to a driving part, itself rotated at a speed above the rotational speed of the rotor.

5. A resonator according to claim 4, wherein the bearing housing includes at least one bearing positioned between the transmission shaft and a housing body fixed to at least one of the parts of the rotor, which are the hub and the rotor mast.

6. A resonator according to claim 4, wherein the rotary support is located above the rotor, which includes a tubular mast passed through by the transmission shaft coaxial with the mast and connected to the driving part on the side of the base of the rotor mast, by which base said rotor mast is rotated.

7. A resonator according to claim 4, wherein the driving part, driving the transmission shaft of the rotary support, is the input shaft of an epicyclic reduction gear of a transmission box rotating the rotor mast.

8. A resonator according to claim 7, wherein the transmission shaft has axial splines meshing with complementary axial splines of said input shaft of the epicyclic reduction gear.

9. A resonator according to claim 1, wherein the rotary support is rotated by a motor, mounted in a fixed or rotating reference system.

10. A resonator according to claim 1, and arranged as a flutter pendular resonator, on which each pendular body is mounted oscillating around a respective axis of pendular motion, which is both perpendicular to the axis of the rotor and to a respective radial axis relative to the axis of the rotor, the resonator being tuned to a natural frequency ($\omega$) proportional to $\Omega$, where $\Omega$ is the rotational speed of the rotor.

11. A resonator according to claim 1, and arranged as a coplanar pendular resonator, whose axis of pendular motion for each pendular body is substantially parallel to the axis of the rotor, the resonator being tuned to a natural frequency ($\omega$), which enables the reduction of the coplanar vibrations and/or the torque oscillations by $b\Omega$, in a fixed reference system, where b is the number of rotor blades and $\Omega$ the rotational speed of the rotor.

12. A resonator according to claim 1, wherein the rotary support is rotated in the same direction of rotation as the rotor.

* * * * *